United States Patent
Kishikawa et al.

(10) Patent No.: US 10,365,142 B2
(45) Date of Patent: *Jul. 30, 2019

(54) FLOW RATE MEASUREMENT DEVICE (71) Applicant: Mitsubishi Electric Corporation, Tokyo (JP)

(72) Inventors: Naoyuki Kishikawa, Tokyo (JP); Yuji Ariyoshi, Tokyo (JP); Masahiro Kawai, Tokyo (JP); Shinichiro Hidaka, Tokyo (JP); Kazuto Akagi, Tokyo (JP)

(73) Assignee: Mitsubishi Electric Corporation, Chiyoda-ku, Tokyo (JP)

( * ) Notice: Subject to any disclaimer, the term of this patent is extended or adjusted under 35 U.S.C. 154(b) by 309 days.

This patent is subject to a terminal disclaimer.

(21) Appl. No.: 15/055,750

(22) Filed: Feb. 29, 2016

(65) Prior Publication Data
US 2017/0122788 A1    May 4, 2017

(30) Foreign Application Priority Data
Oct. 29, 2015  (JP) .................. 2015-212504

(51) Int. Cl.
*G01F 15/18* (2006.01)
*G01F 1/684* (2006.01)
(Continued)

(52) U.S. Cl.
CPC ............ *G01F 15/185* (2013.01); *G01F 1/005* (2013.01); *G01F 1/684* (2013.01); *G01F 1/6842* (2013.01); *G01F 1/696* (2013.01)

(58) Field of Classification Search
CPC ........ G01F 15/185; G01F 1/684; G01F 1/696; G01F 1/6842; G01F 5/00
(Continued)

(56) References Cited

U.S. PATENT DOCUMENTS 6,095,403 A * 8/2000 Akin .................. B23K 1/008
228/180.1
7,377,156 B1 * 5/2008 Mattson .............. B60C 23/0408
340/445
(Continued)

FOREIGN PATENT DOCUMENTS

| JP | 5178388 B2 | | 4/2013 | |
| JP | 5279667 B2 | | 9/2013 | |
| WO | WO 9304367 | * | 3/1993 | ............... B60H 3/00 |

*Primary Examiner* — Eric S. McCall
*Assistant Examiner* — Timothy P Graves
(74) *Attorney, Agent, or Firm* — Sughrue Mion, PLLC; Richard C. Turner (57) ABSTRACT

An environment sensor arranged in a measuring chamber disposed in a circuit board receiving portion does not affect a flow of air through a bypass passage, and thus does not affect detection accuracy of a flow rate detection element arranged in the bypass passage. A recessed portion is disposed in a side surface of a base parallel to a flow direction A of intake air passing through a main passage and a communication port of the measuring chamber is disposed in the recessed portion, and thus the measuring chamber is unlikely to be infiltrated by fouling substances, water droplets, and the like contained in the intake air. The communication port has a small length dimension L, and thus an environment parameter of the intake air is likely to propagate to the measuring chamber and high levels of detection response, detection accuracy, and reliability are ensured for the environment sensor.

9 Claims, 7 Drawing Sheets (51) Int. Cl.
*G01F 1/696* (2006.01)
*G01F 1/00* (2006.01)

(58) Field of Classification Search
USPC .............................. 73/114.32, 114.34, 204.11
See application file for complete search history.

(56) References Cited

U.S. PATENT DOCUMENTS

| | | | |
|---|---|---|---|
| 9,625,292 B2* | 4/2017 | Hidaka | F02M 35/10386 |
| 2010/0031737 A1* | 2/2010 | Saito | G01F 1/6842 |
| | | | 73/114.33 |
| 2011/0072894 A1* | 3/2011 | Saito | F02D 41/187 |
| | | | 73/114.34 |
| 2012/0079879 A1 | 4/2012 | Saito et al. | |
| 2013/0283895 A1* | 10/2013 | Etherington | G01F 1/6842 |
| | | | 73/114.34 |
| 2016/0097661 A1* | 4/2016 | Hidaka | G01F 1/34 |
| | | | 73/114.33 |

\* cited by examiner

FLOW RATE MEASUREMENT DEVICE

BACKGROUND OF THE INVENTION

Field of the Invention

The present invention relates to a flow rate measurement device that measures a fluid to be measured passing through piping, for example, the amount of intake air of an internal combustion engine, and, more particularly, to a flow rate measurement device that is integrated with an environment sensor.

Description of the Background Art

Environment sensors such as a temperature measurement device, a humidity measurement device, and a pressure measurement device and control equipment are arranged, along with a flow rate measurement device that measures the amount of intake air, in an engine room of a car that uses an electronically-controlled fuel injection system. In recent years, reduction of vehicle parts assembly man-hours and wire harness simplification through integration between these environment sensors and the flow rate measurement device have been proposed.

For example, in Patent Document 1, a circuit board of a flow rate measurement device and at least one of a separate humidity measurement device and a separate pressure measurement device are assembled in a housing of the flow rate measurement device for flow rate measurement device-environment sensor integration.

In Patent Document 2, a flow rate detection element is arranged in a first sub-flow path that takes a part of intake air from a main passage, and a humidity measurement device that is mounted on a circuit board of a flow rate measurement device is arranged in a second sub-flow path that is disposed in the first sub-flow path.

In Patent Document 3, an environment sensor element is arranged in a measuring chamber that is disposed in an end portion of a supporting substrate to which a flow rate detection element and a signal processing circuit are fixed. In this example, the measuring chamber is positioned on the side opposite to the signal processing circuit across a sub-flow path where the flow rate detection element is arranged, and has a communication hole for communication with the sub-flow path.

[Patent Document 1] US Patent Publication No. 2013/0283895 A1

[Patent Document 2] Japanese Patent No. 5178388

[Patent Document 3] Japanese Patent No. 5279667

However, in the structures that are described in Patent Documents 1 to 3, integration between the flow rate measurement device and the environment sensor poses the following problems. In Patent Document 1, an environment sensor that is separate from the circuit board of the flow rate measurement device is integrated with the flow rate measurement device, and thus the number of environment sensor assembly processes increases compared to a case where the environment sensor is mounted on the circuit board of the flow rate measurement device.

In Patent Document 2, the humidity measurement device is mounted on the circuit board of the flow rate measurement device and the circuit board is electrically connected to a connector terminal through wire bonding. In a case where the humidity measurement device is soldered on the same surface as a wire bonding pad on the circuit board, a flux is attached to the pad and bonding strength between a wire and the pad declines.

The circuit board has to be cleaned with a chemical after the soldering of the humidity measurement device so as to remove the flux attached to the wire bonding pad. However, the environment sensor such as the humidity measurement device may malfunction for chemical attachment, and measures such as protection of an element portion with a mask are required. This causes an increase in the process steps.

As a method for avoiding a circuit board cleaning process for flux removal, the wire bonding pad is arranged at a sufficient distance from the electronic component such as the humidity measurement device. In this case, the circuit board has to be larger in size although flux scattering to the pad can be prevented.

In the structure that is described in Patent Document 2, the second sub-flow path may be infiltrated by fouling substances, water droplets, or the like and the environment sensor element may be stained, which may cause reduction in detection response and detection accuracy of the environment sensor element. In addition, air flow in the first sub-flow path may be disturbed since the second sub-flow path is disposed in the first sub-flow path where the flow rate detection element is arranged. This may adversely affect detection accuracy of the flow rate detection element.

In the structure that is described in Patent Document 3, an end face of the supporting substrate where the environment sensor element is arranged is exposed in the measuring chamber, and durability and reliability are required for the supporting substrate. Accordingly, a ceramic substrate has to be used for the supporting substrate, and cost reduction is impeded. Although the environment sensor element, the flow rate detection element, and the signal processing circuit are arranged on the same surface of the supporting substrate, the environment sensor element, the flow rate detection element, and the signal processing circuit cannot be arranged in close proximity, and thus the supporting substrate has to have a large size.

SUMMARY OF THE INVENTION

The present invention has been made in order to address the above-described problems, and an objective thereof is to provide a compact and low-cost flow rate measurement device which is integrated with an environment sensor in the interest of reliability and productivity of the flow rate measurement device and ensures high levels of detection accuracy and reliability for the environment sensor.

A flow rate measurement device according to the present invention, which is a flow rate measurement device inserted into a through-hole disposed in piping and measuring a flow rate of a fluid to be measured that has a main passage in the piping, includes a connector that has a connector terminal which transmits and receives a signal to and from an external device, a flow rate detection element that is arranged in a bypass passage in which a part of the fluid to be measured passing through the main passage is taken, a circuit board that includes a plurality of wire bonding pads, which are electrically connected to the connector terminal and the flow rate detection element respectively, on one surface, a circuit board receiving portion that supports and receives the circuit board, an environment sensor that is mounted on the other surface of the circuit board and measures at least one of temperature, humidity, and pressure of the fluid to be measured, and a measuring chamber that is disposed in the circuit board receiving portion, the environment sensor being arranged in the measuring chamber, in which a recessed portion with apart more recessed than the other parts is disposed in an outer wall surface of the circuit board receiving portion forming the measuring chamber and parallel to a flow direction of the fluid to be measured passing through the main passage and a communication port allowing the main passage and the measuring chamber to communicate with each other is disposed in the recessed portion.

According to the present invention, the environment sensor is mounted on the circuit board, and thus an increase in the number of processes attributable to environment sensor integration does not occur. In addition, the circuit board can be reduced in size when the environment sensor is mounted on the surface on the side opposite to the wire bonding pad. Since the environment sensor is arranged in the measuring chamber that is disposed in the circuit board receiving portion, the environment sensor is not directly exposed to the fluid to be measured, and high levels of detection response and detection accuracy can be obtained while the flow of the fluid to be measured through the bypass passage in which the flow rate detection element is arranged is not affected and thus detection accuracy of the flow rate detection element is not affected. Furthermore, since the communication port of the measuring chamber is disposed in the recessed portion, the measuring chamber is unlikely to be infiltrated by fouling substances, water droplets, and the like contained in the fluid to be measured. Also, since the length dimension of the communication port decreases and an environment parameter of the fluid to be measured is likely to propagate to the measuring chamber, the environment sensor can achieve high levels of detection accuracy and reliability. Accordingly, the flow rate measurement device that is reduced in size can be obtained at a low cost with the flow rate measurement device integrated with the environment sensor in the interest of reliability and productivity and high levels of detection accuracy and reliability ensured for the environment sensor.

The foregoing and other objects, features, aspects and advantages of the present invention will become more apparent from the following detailed description of the present invention when taken in conjunction with the accompanying drawings.

DETAILED DESCRIPTION OF THE PREFERRED EMBODIMENTS

First Embodiment

Figure 1:
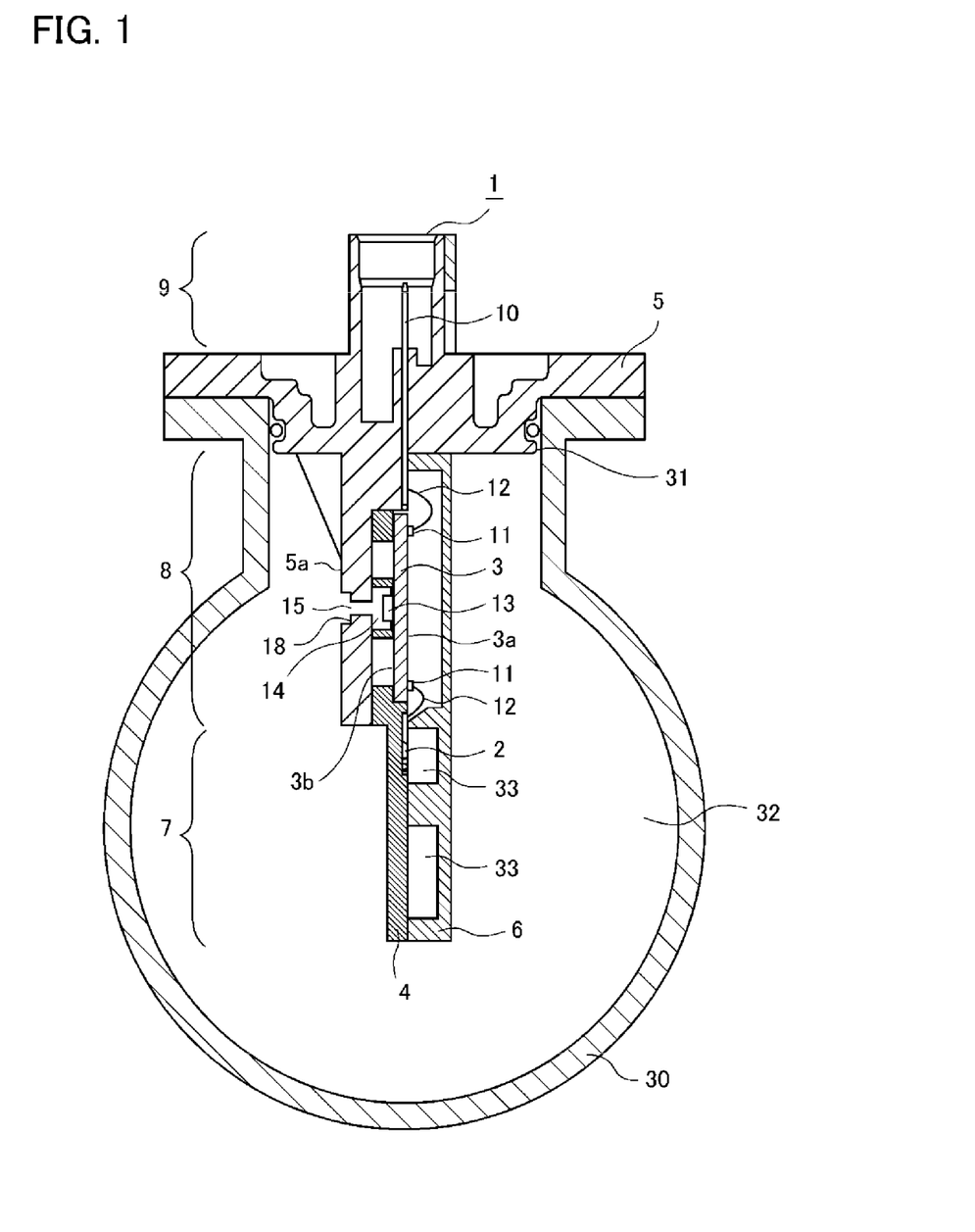
FIG. 1 is a cross-sectional view illustrating a flow rate measurement device according to a first embodiment of the present invention.
Figure 2:
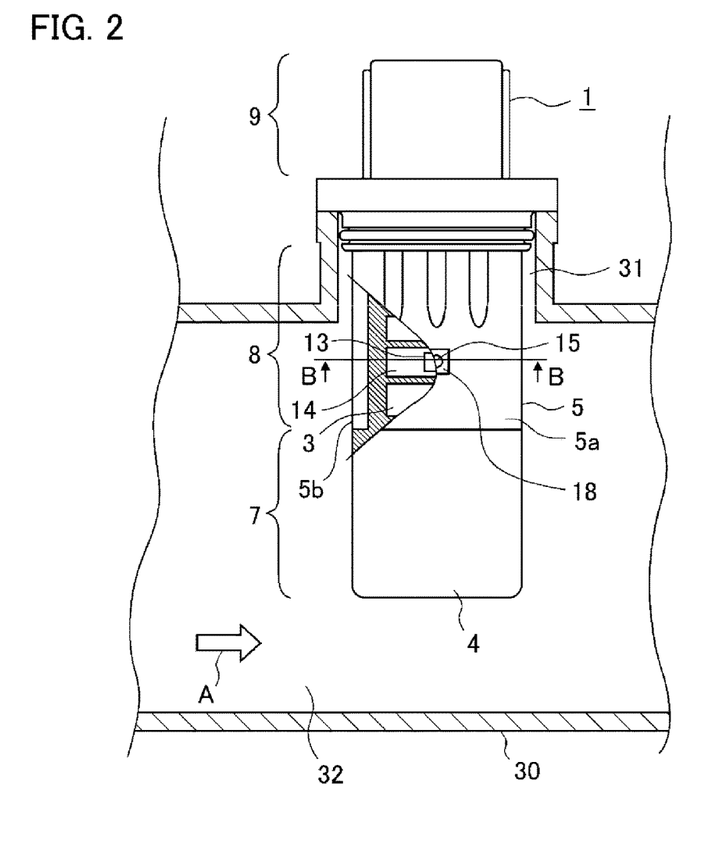
FIG. 2 is a side view in which a part of the flow rate measurement device according to the first embodiment of the present invention is cut.
Figure 3:
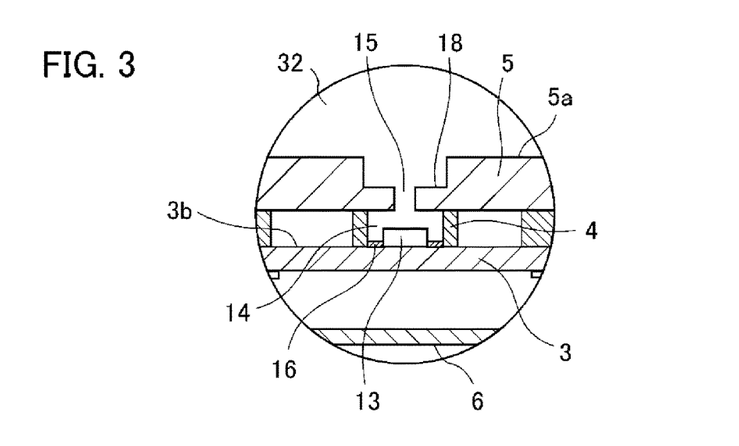
FIG. 3 is a cross-sectional view illustrating a measuring chamber of the flow rate measurement device according to the first embodiment of the present invention.

Hereinafter, a flow rate measurement device according to a first embodiment of the present invention will be described with reference to accompanying drawings. FIG. 1 is a cross-sectional view illustrating the flow rate measurement device according to the first embodiment. FIG. 2 is a side view in which a part of the flow rate measurement device according to the first embodiment is cut. FIG. 3 is a cross-sectional view of the B-B part in FIG. 2, which illustrates a measuring chamber of the flow rate measurement device. The same reference numerals are attached to the same and corresponding parts in the drawings.

A flow rate measurement device 1 is inserted into a through-hole that is disposed in piping, and measures a flow rate of a fluid to be measured that has a main passage in the piping. In the first embodiment, the flow rate measurement device 1 is inserted into an insertion opening 31 that is formed in intake piping 30 of an internal combustion engine as illustrated in FIG. 1, and measures a flow rate of intake air that has a main passage 32 in the intake piping 30. An arrow A in FIG. 2 illustrates a direction in which the intake air flows through the main passage 32.

The flow rate measurement device 1 has a flow rate detection unit 7, a circuit board receiving portion 8, and a connector 9 in order from an insertion-direction tip portion. In the flow rate detection unit 7, a flow rate detection element 2 is supported by a plate 4, and the plate 4 is supported by a base 5. A cover 6 is arranged to be superimposed on the base 5 and the plate 4 and is bonded to the base 5 and the plate 4. The plate 4 and the cover 6 form a bypass passage 33 in which a part of the intake air passing through the main passage 32 is taken. The flow rate detection element 2 is arranged in the bypass passage 33.

The plate 4, the base 5, and the cover 6 constitute the circuit board receiving portion 8. In the circuit board receiving portion 8, a circuit board 3 is supported by the plate 4 with one surface (first surface 3a) of the circuit board 3 covered by the cover 6 and the other surface (second surface 3b) of the circuit board 3 covered by the base 5.

The connector 9 that has a connector terminal 10 which transmits and receives a signal to and from an external device (not illustrated) is formed by a part of the base 5. The connector terminal 10 is molded integrally with the base 5. The flow rate measurement device 1 is installed in the intake piping 30 when a part of the base 5 is mounted on the intake piping 30 by using a screw (not illustrated) or the like out of the intake piping 30.

A plurality of wire bonding pads 11 (hereinafter, simply referred to as the pads 11) are arranged on the first surface 3a of the circuit board 3. The circuit board 3 is electrically connected to the connector terminal 10 and the flow rate detection element 2 through wire bonding in which a wire 12 is used as a bonding member.

An environment sensor 13 that measures at least one of temperature, humidity, and pressure of the fluid to be measured is mounted on the second surface 3b of the circuit board 3 by soldering. In other words, the environment sensor 13 includes at least one of a temperature measurement device that is provided with a temperature sensor, a humidity measurement device that is provided with a humidity sensor, and a pressure measurement device that is provided with a pressure sensor. The environment sensor 13 may include a measurement device other than those described above.

In addition, a plurality of electronic components (not illustrated) other than the environment sensor 13 are mounted on the first surface 3a and the second surface 3b of the circuit board 3 by soldering. All of the plurality of electronic components other than the environment sensor 13 may be mounted only on the second surface 3b or may be mounted only on the first surface 3a. In any case, the circuit board receiving portion 8 receives the circuit board 3 for the electronic components other than the environment sensor 13 not to be exposed to the intake air.

The environment sensor 13 is arranged in a measuring chamber 14 that is disposed at a part of the circuit board receiving portion 8. Only the environment sensor 13 is the electronic component that is arranged in the measuring chamber 14. In the first embodiment, the circuit board 3, the base 5, and the plate 4 constitute the measuring chamber 14. However, the measuring chamber 14 is not limited thereto. A joint between the environment sensor 13 and the circuit board 3 that is exposed in the measuring chamber 14 is coated with a coating agent 16.

A recessed portion 18 with a part more recessed than the other parts is disposed in an outer wall surface of the circuit board receiving portion 8 that forms the measuring chamber 14 and is parallel to the flow direction A of the intake air passing through the main passage 32 (side surface 5a of the base 5 illustrated in FIG. 2). A communication port 15 that allows the measuring chamber 14 and the main passage 32 to communicate with each other is disposed in the recessed portion 18. Accordingly, the environment sensor 13 that is arranged in the measuring chamber 14 can measure the temperature, the humidity, and the pressure of the intake air passing through the main passage 32.

A reason why the communication port 15 of the measuring chamber 14 is disposed in the side surface 5a of the base 5 that is parallel to the flow direction A of the intake air will be described with reference to FIG. 2. Upon reaching the flow rate measurement device 1, a part of the intake air passing through the main passage 32 collides with a front surface 5b of the base 5 and is separated from the flow rate measurement device 1. Accordingly, fouling substances, water droplets, and the like contained in the intake air are unlikely to reach the communication port 15 that is disposed in the side surface 5a which is orthogonal to the front surface 5b of the base 5. For this reason, it is desirable that the communication port 15 is disposed in the side surface 5a of the base 5.

Figure 4:
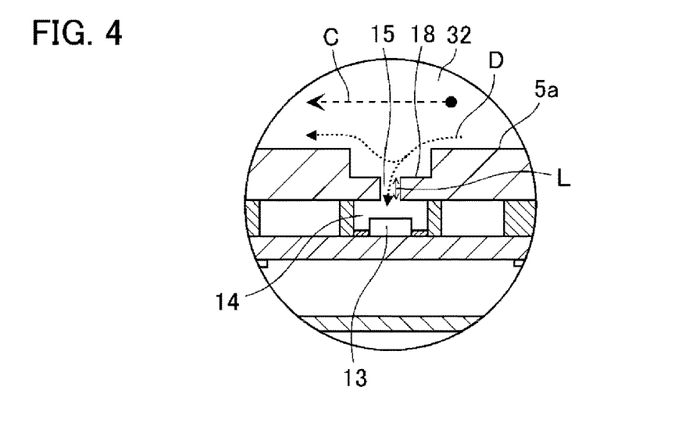
FIG. 4 is a drawing showing an effect of the flow rate measurement device according to the first embodiment of the present invention.

Hereinafter, an effect that is achieved when the communication port 15 is disposed in the recessed portion 18 in the flow rate measurement device 1 according to the first embodiment will be described with reference to FIG. 4. The fouling substances, the water droplets, and the like contained in the intake air pass with an inertial force, in a state of being accelerated due to the flow of the intake air through the main passage 32, along the trajectory indicated by an arrow C in the drawing. Accordingly, the fouling substances, the water droplets, and the like are unlikely to reach the communication port 15, which is disposed in the recessed portion 18 more recessed than the other parts, in the side surface 5a of the base 5 parallel to the flow direction A of the intake air.

When the recessed portion 18 is disposed, a length dimension L of the communication port 15 that connects the main passage 32 and the measuring chamber 14 to each other can be reduced, which is another effect achieved when the communication port 15 is disposed in the recessed portion 18 in the flow rate measurement device 1 according to the first embodiment. It is desirable that the communication port 15 has a small opening area for fouling substance infiltration, water droplet infiltration, and the like to be prevented. However, when the length dimension L of the communication port 15 with a small opening area increases, an environment parameter of the intake air passing through the main passage 32 becomes unlikely to propagate to the measuring chamber 14.

When the recessed portion 18 is disposed in the side surface 5a of the base 5, the intake air passing through the vicinity of the communication port 15 of the main passage 32 has the trajectory indicated by an arrow D in the drawing. In this case, the length dimension L of the communication port 15 is smaller than in a case where the recessed portion 18 is not disposed. Accordingly, the environment parameter of the intake air is likely to propagate to the measuring chamber 14. As a result, the environment sensor 13 is improved in terms of detection response and detection accuracy.

Next, a mounting process that is used in a case where the electronic component other than the environment sensor 13 is mounted on the first surface 3a of the circuit board 3 and only the environment sensor 13 is mounted on the second surface 3b will be described as a method for manufacturing the flow rate measurement device 1.

Firstly, the electronic component other than the environment sensor 13 is mounted, by soldering, on the first surface 3a that has the pad 11. Then, the circuit board 3 is cleaned with a chemical or the like so as to remove flux that is attached to the pad 11 through the soldering process. Then, the environment sensor 13 is mounted on the second surface 3b of the circuit board 3 by soldering.

In the mounting process, the electronic component other than the environment sensor 13 may be mounted on both the first surface 3a and the second surface 3b. Also, all of the electronic components including the environment sensor 13 may be mounted on the second surface 3b. In the latter case, flux attachment to the pad 11 does not occur, and thus the circuit board 3 does not have to be cleaned.

As described above, the environment sensor 13 is mounted on the circuit board 3, as is the case with the other electronic component, according to the first embodiment. Accordingly, process addition attributable to integration between the flow rate measurement device 1 and the environment sensor 13 is not required. The environment sensor 13 is mounted on the second surface 3b that does not have the pad 11, and thus no flux is attached to the pad 11 during the soldering of the environment sensor 13. Accordingly, a cleaning process for the circuit board 3 after the mounting of the environment sensor 13 can be avoided.

In a case where the electronic component other than the environment sensor 13 is soldered on the first surface 3a that has the pad 11, the flux attached to the pad 11 can be removed by cleaning the circuit board 3 before the mounting of the environment sensor 13. Accordingly, the pad 11 does not have to be arranged away from the electronic component and the circuit board 3 can be reduced in size.

Since the recessed portion 18 is disposed in the side surface 5a of the base 5 that is parallel to the flow direction A of the intake air passing through the main passage 32 and the communication port 15 of the measuring chamber 14 is disposed in the recessed portion 18, the measuring chamber 14 is unlikely to be infiltrated by the fouling substances, the water droplets, and the like contained in the intake air and effects of the fouling substances, the water droplets, and the like can be suppressed. In addition, since the length dimension L of the communication port 15 that connects the main passage 32 and the measuring chamber 14 to each other is reduced, the environment parameter of the intake air passing through the main passage 32 is likely to propagate to the measuring chamber 14. Accordingly, high levels of detection response, detection accuracy, and reliability are ensured for the environment sensor 13.

Since the measuring chamber 14 is disposed in the circuit board receiving portion 8 that is isolated from the flow rate detection unit 7, the environment sensor 13 does not affect air flow in the bypass passage 33. Accordingly, decline in detection accuracy of the flow rate detection element 2 that is arranged in the bypass passage 33 is prevented by integration with the environment sensor 13.

In addition, an end face of the circuit board 3 is not exposed in the measuring chamber 14, and thus no ceramic substrate has to be used for the circuit board 3 and an inexpensive material such as a glass epoxy substrate can be selected for the circuit board 3. As described above, the flow rate measurement device 1 that is reduced in size can be obtained at a low cost according to the first embodiment with the flow rate measurement device 1 integrated with the environment sensor 13 in the interest of reliability and productivity and high levels of detection accuracy and reliability ensured for the environment sensor 13.

Second Embodiment

Figure 5:
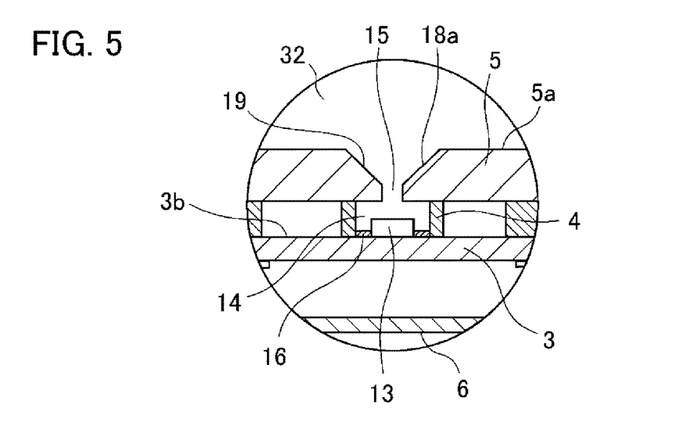
FIG. 5 is a cross-sectional view illustrating a measuring chamber of a flow rate measurement device according to a second embodiment of the present invention.

FIG. 5 is a cross-sectional view illustrating a measuring chamber of a flow rate measurement device according to a second embodiment of the present invention. The flow rate measurement device according to the second embodiment is similar in overall configuration to the flow rate measurement device according to the first embodiment, and thus FIG. 1 will be used not to repeat detailed description of each portion. In the second embodiment, the communication port 15 is disposed in a recessed portion 18a that is disposed in the side surface 5a of the base 5 as in the first embodiment described above. In addition, a tapered portion 19 is disposed in the second embodiment so that an opening portion of the recessed portion 18a widens toward the main passage 32 side.

Figure 6:
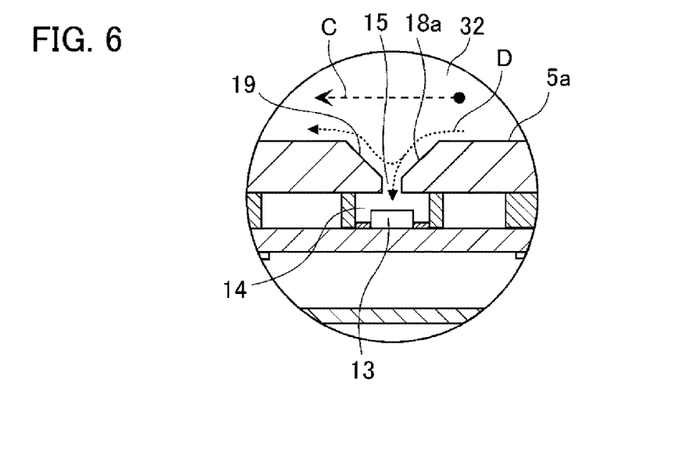
FIG. 6 is a drawing showing an effect of the flow rate measurement device according to the second embodiment of the present invention.

An effect achieved when the communication port 15 is disposed in the recessed portion 18a that has the tapered portion 19 in the flow rate measurement device 1 according to the second embodiment will be described with reference to FIG. 6. The effect of the fouling substances, the water droplets, and the like that pass along the trajectory indicated by the arrow C in the drawing being unlikely to reach the communication port 15 is as described above in the first embodiment. Additionally, the presence of the tapered portion 19 allows the environment parameter of the intake air passing through the main passage 32 to be more likely to be taken by the communication port 15. Furthermore, even in a case where the water droplets and the like are attached to the communication port 15, the water droplets and the like are likely to be discharged along the tapered portion 19.

Figure 7:
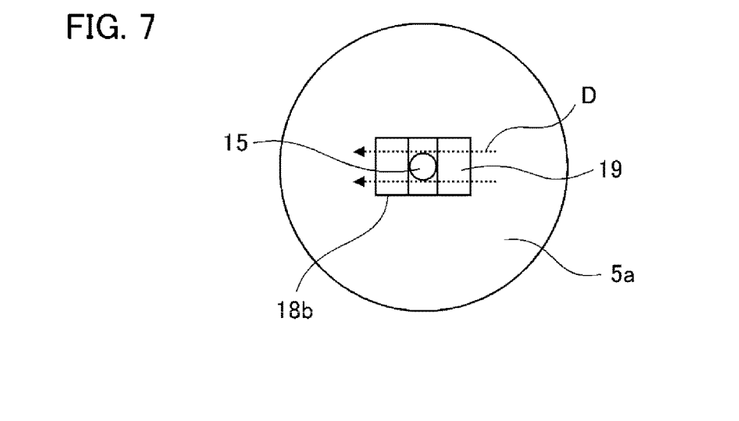
FIG. 7 is a side view illustrating the vicinity of a communication port of the flow rate measurement device according to the second embodiment of the present invention.

The recessed portion and the tapered portion are not particularly limited in shape, and various modification examples are conceivable with regard thereto. For example, the tapered portion 19 of a recessed portion 18b that is illustrated in FIG. 7 is disposed so that an opening portion of the recessed portion 18b widens on an upstream side and a downstream side of the flow direction of the intake air (shown by the arrow D in the drawing). When this configuration is employed, the intake air passing through the vicinity of the communication port 15 of the main passage 32 is smoothly guided to the communication port 15, and the environment parameter can propagate to the measuring chamber 14 earlier.

Figure 8:
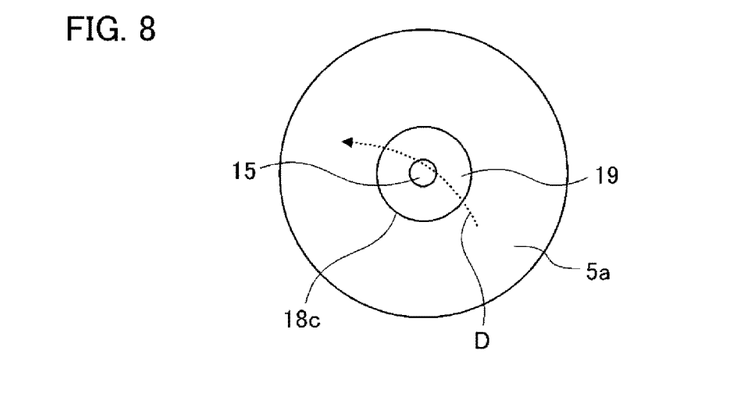
FIG. 8 is a side view illustrating the vicinity of the communication port of the flow rate measurement device according to the second embodiment of the present invention.

The tapered portion 19 of a recessed portion 18c that is illustrated in FIG. 8 is disposed so that an opening portion of the recessed portion 18c widens in a radial shape. When this configuration is employed, the intake air passing through the vicinity of the communication port 15 of the main passage 32 is smoothly guided to the communication port 15 regardless of the flow direction even in the case of a drift (shown by the arrow D in the drawing) in the flow of the intake air passing through the main passage 32, and the environment parameter can propagate to the measuring chamber 14 earlier.

The second embodiment achieves effects similar to those achieved by the first embodiment. In addition, according to the second embodiment, the intake air passing through the main passage 32 is more likely to be taken to the communication port 15 than in the first embodiment, and thus the propagation of the environment parameter toward the measuring chamber 14 is accelerated and the environment sensor 13 is improved in terms of detection response and detection accuracy.

Third Embodiment

Figure 9:
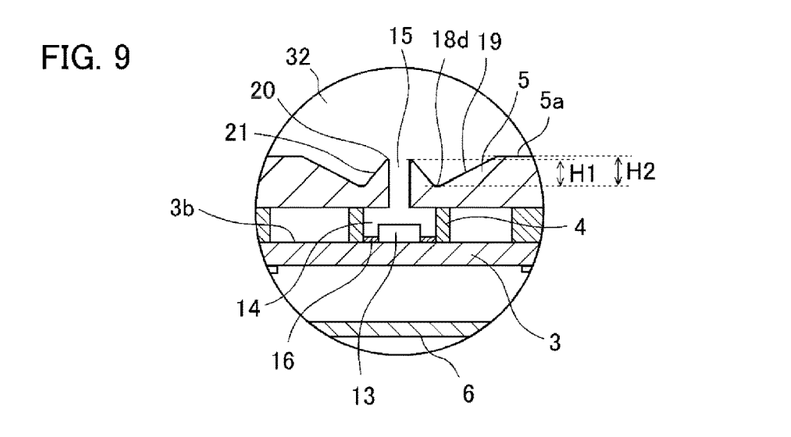
FIG. 9 is a cross-sectional view illustrating a measuring chamber of a flow rate measurement device according to a third embodiment of the present invention.

FIG. 9 is a cross-sectional view illustrating a measuring chamber of a flow rate measurement device according to a third embodiment of the present invention. The flow rate measurement device according to the third embodiment is similar in overall configuration to the flow rate measurement device according to the first embodiment, and thus FIG. 1 will be used not to repeat detailed description of each portion. In the third embodiment, the tapered portion 19 is disposed as in the second embodiment described above so that the opening portion of the recessed portion 18a widens toward the main passage 32 side. In addition, a raised portion 20 that surrounds the communication port 15 is disposed in the recessed portion 18.

In a case where the communication port 15 is sealed by the water droplets and the like contained in the intake air and the measuring chamber 14 is isolated from the main passage 32, the environment sensor 13 cannot accurately measure the environment parameter of the intake air passing through the main passage 32.

As illustrated in FIG. 9, the flow rate measurement device 1 according to the third embodiment has the raised portion 20 that surrounds the communication port 15 and the raised portion 20 is disposed in a recessed portion 18$d$ that is disposed in the side surface 5$a$ of the base 5. The raised portion 20 has a tapered portion 21 that faces the tapered portion 19 of the recessed portion 18$d$. A height dimension H1 of the raised portion 20 is smaller than a depth dimension H2 of the recessed portion 18$d$ and decreases farther away from the communication port 15. Still, shapes of the raised portion 20 and the recessed portion 18$d$ are not limited to those illustrated in FIG. 9.

Figure 10:
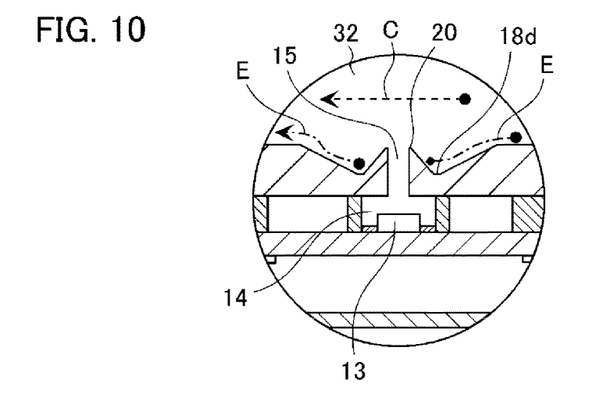
FIG. 10 is a drawing showing an effect of the flow rate measurement device according to the third embodiment of the present invention.

An effect achieved when the communication port 15 is disposed in the recessed portion 18$d$ that has the tapered portion 19 and the raised portion 20 surrounding the communication port 15 is disposed in the flow rate measurement device 1 according to the third embodiment will be described with reference to FIG. 10. The effect of the fouling substances, the water droplets, and the like that pass along the trajectory indicated by the arrow C in the drawing being unlikely to reach the communication port 15 is as described above in the first embodiment.

In a case where the fouling substances, the water droplets, and the like move on the side surface 5$a$ of the base 5 along the trajectory indicated by an arrow E in the drawing in this third embodiment, the raised portion 20 can prevent the fouling substances, the water droplets, and the like from reaching the communication port 15. In addition, the height dimension H1 of the raised portion 20 is smaller than the depth dimension H2 of the recessed portion 18$d$ and the raised portion 20 does not pop out within the main passage 32, and thus air disturbance and pressure loss can be suppressed.

The third embodiment achieves effects similar to those achieved by the first and second embodiments. In addition, according to the third embodiment, the fouling substance infiltration, the water droplet infiltration, and the like from the main passage 32 into the measuring chamber 14 can be further reliably prevented, and the reliability of the environment sensor 13 is improved.

Fourth Embodiment

Figure 11:
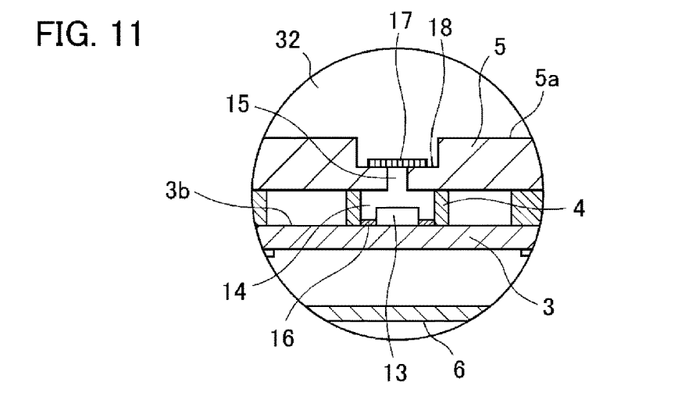
FIG. 11 is a cross-sectional view illustrating a measuring chamber of a flow rate measurement device according to a fourth embodiment of the present invention.
Figure 12:
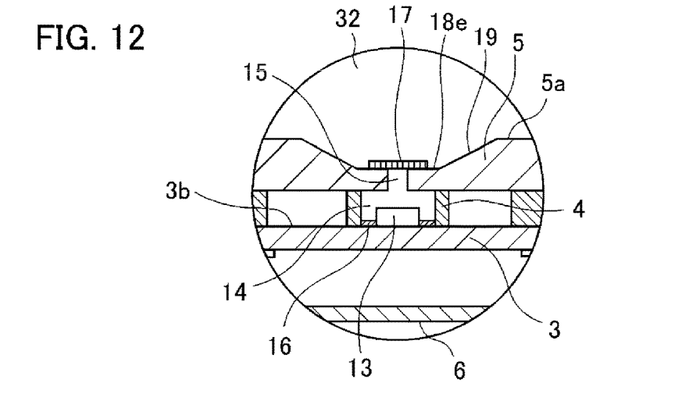
FIG. 12 is a cross-sectional view illustrating the measuring chamber of the flow rate measurement device according to the fourth embodiment of the present invention.

FIGS. 11 and 12 are cross-sectional views illustrating a measuring chamber of a flow rate measurement device according to a fourth embodiment of the present invention. The flow rate measurement device according to the fourth embodiment is similar in overall configuration to the flow rate measurement device according to the first embodiment, and thus FIG. 1 will be used not to repeat detailed description of each portion.

In the flow rate measurement device according to the fourth embodiment, a waterproof and moisture-permeable filter 17 is disposed at the communication port 15 of the measuring chamber 14. The filter 17 is fixed to a main passage 32 side surface of the recessed portion 18 disposed in the side surface 5$a$ of the base 5 by bonding, welding, or the like. Since the filter 17 is fixed in the recessed portion 18, the filter 17 is unlikely to be in direct contact with a finger or the like during handling of the flow rate measurement device 1, and thus damage to or peeling of the filter 17 can be prevented.

In this fourth embodiment, the filter 17 is fixed on the main passage 32 side of the communication port 15, and thus the vicinity of the communication port 15 on the main passage 32 side should be flat. For example, the filter 17 can be disposed on the recessed portion 18 opening perpendicularly to the side surface 5$a$ of the base 5 as illustrated in FIG. 11. In addition, as illustrated in FIG. 12, the filter 17 can be disposed even on a recessed portion 18$e$ that has the tapered portion 19 insofar as the vicinity of the communication port 15 is flat.

The filter 17 is disposed at the communication port 15 so that the measuring chamber 14 is not infiltrated by the fouling substances and the water droplets contained in the intake air. Since the filter 17 is moisture-permeable, humidity measurement can be performed normally even in a case where the environment sensor 13 that is arranged in the measuring chamber 14 is the humidity measurement device. Accordingly, the filter 17 does not affect humidity detection response and humidity detection accuracy.

According to the fourth embodiment, effects similar to those of the first and second embodiments can be achieved. In addition, according to the fourth embodiment, the infiltration of the fouling substances, the water droplets, and the like from the main passage 32 into the measuring chamber 14 can be prevented more reliably than in the first and second embodiments and the environment sensor 13 is improved in terms of reliability.

Fifth Embodiment

Figure 13:
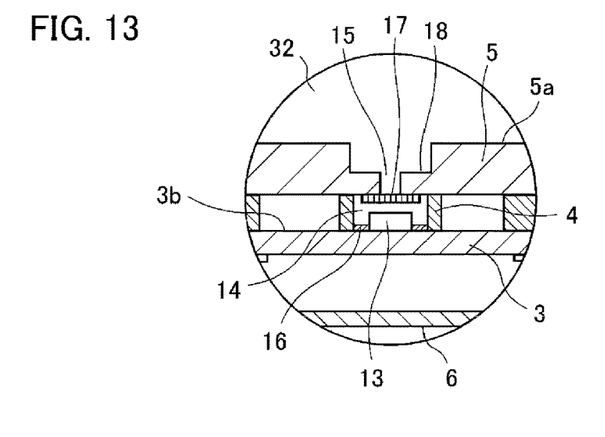
FIG. 13 is a cross-sectional view illustrating a measuring chamber of a flow rate measurement device according to a fifth embodiment of the present invention.
Figure 14:
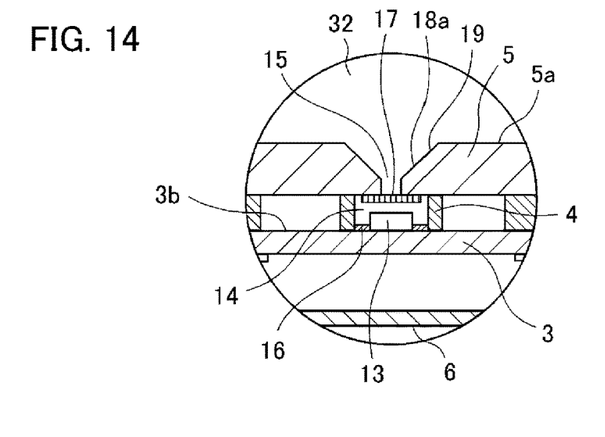
FIG. 14 is a cross-sectional view illustrating the measuring chamber of the flow rate measurement device according to the fifth embodiment of the present invention.
Figure 15:
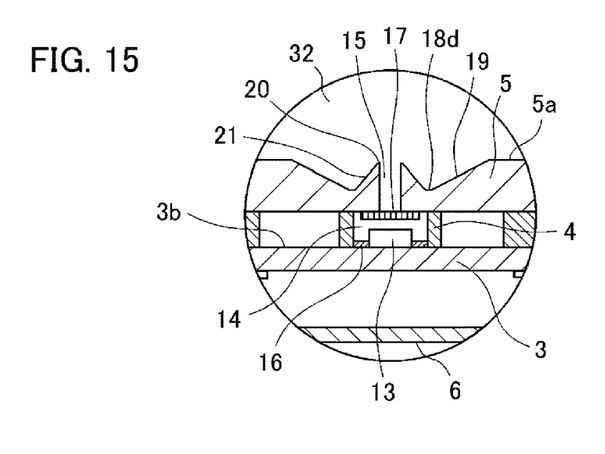
FIG. 15 is a cross-sectional view illustrating the measuring chamber of the flow rate measurement device according to the fifth embodiment of the present invention.

FIGS. 13 to 15 are cross-sectional views illustrating a measuring chamber of a flow rate measurement device according to a fifth embodiment of the present invention. The flow rate measurement device according to the fifth embodiment is similar in overall configuration to the flow rate measurement device according to the first embodiment, and thus FIG. 1 will be used not to repeat detailed description of each portion.

In the flow rate measurement device according to the fifth embodiment, the waterproof and moisture-permeable filter 17 is disposed at the communication port 15 of the measuring chamber 14. The filter 17 is fixed from an inside of the measuring chamber 14 by bonding, welding, or the like. Since the filter 17 is fixed on the inside of the measuring chamber 14, the filter 17 is not in contact with a finger or the like during the handling of the flow rate measurement device 1, and thus the damage to or peeling of the filter 17 can be reliably prevented.

In this fifth embodiment, the filter 17 is fixed to the inside of the measuring chamber 14, and thus the vicinity of the communication port 15 on the main passage 32 can have any shape. For example, the filter 17 can be disposed on the recessed portion 18 opening perpendicularly to the side surface 5$a$ of the base 5 as illustrated in FIG. 13 and can be disposed on the recessed portion 18$a$ which has the tapered portion 19 as illustrated in FIG. 14. In addition, the filter 17 can be fixed without any problem even when the raised portion 20 surrounding the communication port 15 is disposed in the recessed portion 18$d$ as illustrated in FIG. 15.

According to the fifth embodiment, effects similar to those of the first to fourth embodiments can be achieved. In addition, according to the fifth embodiment, the infiltration of the fouling substances, the water droplets, and the like from the main passage 32 into the measuring chamber 14 can be prevented more reliably than in the first to fourth embodiments and the environment sensor 13 is improved in terms of reliability.

Sixth Embodiment

Figure 16:
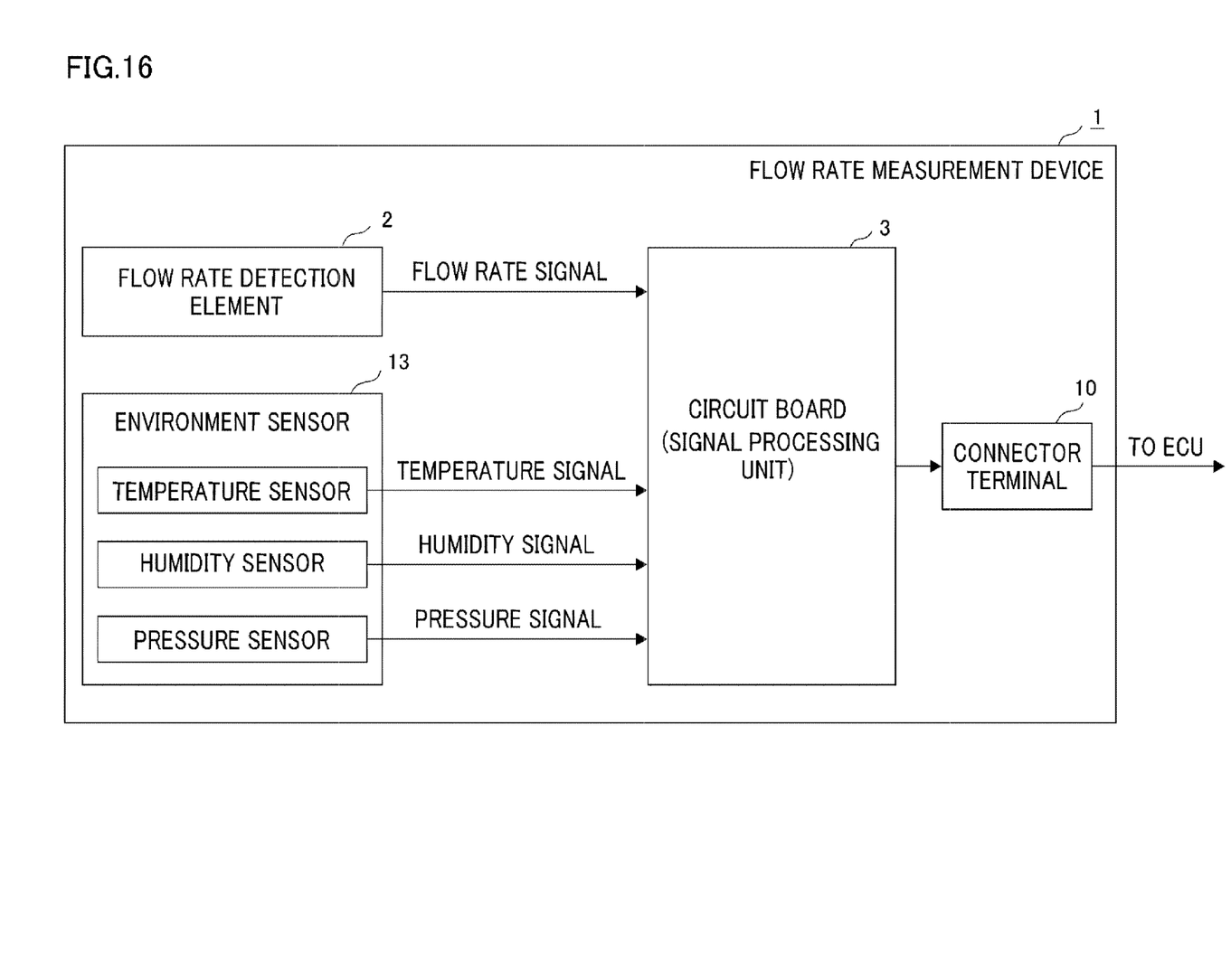
FIG. 16 is a diagram illustrating a sensor signal processing method for a flow rate measurement device according to a sixth embodiment of the present invention.

FIG. 16 is a diagram illustrating sensor signal processing for a flow rate measurement device according to a sixth embodiment of the present invention. In the sixth embodiment, an output of the environment sensor 13 is superimposed on an output of the flow rate measurement device 1 so that the connector terminal 10 is not increased in number through integration with the environment sensor 13. The flow rate measurement device according to the sixth embodiment is similar in overall configuration to the flow rate measurement device according to the first embodiment, and thus FIG. 1 will be used not to repeat detailed description of each portion.

As illustrated in FIG. 16, the flow rate measurement device 1 outputs a flow rate signal. In a case where the environment sensor 13 includes the temperature sensor, the humidity sensor, and the pressure sensor, the flow rate measurement device 1 outputs a temperature signal, a humidity signal, and a pressure signal. Each of the sensor signals that are output from the environment sensor 13 is superimposed on the flow rate signal in a signal processing unit of the circuit board 3, and is transmitted to an engine control unit (ECU) via the connector terminal 10.

Any communication method that is in general use as an in-vehicle LAN communication method is used for communication between the flow rate measurement device 1 and the ECU. Examples thereof include single edge nibble transmission (SENT), local interconnect network (LIN), inter-integrated circuit (I2C), controller area network (CAN), and peripheral sensor interface 5 (PSI5).

According to the sixth embodiment, the flow rate measurement device 1 and the environment sensor 13 share the connector terminal 10, and thus the connector terminal 10 is not increased in number through integration between the environment sensor 13 and the flow rate measurement device 1. The embodiments of the present invention can be combined with each other or one another in the scope of the present invention and each of the embodiments can be appropriately modified or omitted.

Various modifications and alterations of this invention will be apparent to those skilled in the art without departing from the scope and spirit of this invention, and it should be understood that this is not limited to the illustrative embodiments set forth herein.

What is claimed is:

1. A flow rate measurement device that is inserted into a through-hole which is disposed in piping, and measures a flow rate of a fluid to be measured that has a main passage in the piping, the flow rate measurement device comprising:
a connector that includes a connector terminal which transmits and receives a signal to and from an external device;
a flow rate detection element that is arranged in a bypass passage in which a part of the fluid to be measured passing through the main passage is taken;
a circuit board that includes a plurality of wire bonding pads, which are electrically connected to the connector terminal and the flow rate detection element respectively, on one surface;
a circuit board receiving portion that supports and receives the circuit board;
an environment sensor that is mounted on another surface of the circuit board opposite said one surface and measures at least one of temperature, humidity, and pressure of the fluid to be measured; and
a measuring chamber that is disposed in the circuit board receiving portion, the environment sensor being arranged in the measuring chamber,
wherein a recessed portion is disposed in an outer wall surface of the circuit board receiving portion forming the measuring chamber, said outer wall surface facing the fluid to be measured in said main passage and being parallel to a flow direction of said fluid to be measured passing through the main passage, and said recessed portion being a part of said outer wall surface that is recessed relative to other parts of said outer wall surface, and wherein a communication port allowing the main passage and the measuring chamber to communicate with each other is disposed in and surrounded by the recessed portion, and
wherein a raised portion surrounding the communication port is disposed in the recessed portion.

2. The flow rate measurement device according to claim 1,
wherein an electronic component other than the environment sensor is mounted on one or both of the one surface and the other surface of the circuit board and the circuit board receiving portion receives the circuit board such that the electronic component other than the environment sensor is not exposed to the fluid to be measured.

3. The flow rate measurement device according to claim 1,
wherein a tapered portion is disposed in the recessed portion such that an opening portion of the recessed portion widens toward the main passage side.

4. The flow rate measurement device according to claim 3,
wherein the tapered portion is disposed such that the opening portion widens on an upstream side and a downstream side of the flow direction of the fluid to be measured.

5. The flow rate measurement device according to claim 1,
wherein a height dimension of the raised portion is smaller than a depth dimension of the recessed portion and said height dimension decreases farther away from the communication port.

6. The flow rate measurement device according to claim 1,
wherein a waterproof and moisture-permeable filter is disposed in the communication port.

7. The flow rate measurement device according to claim 6,
wherein the filter is fixed from an inside of the measuring chamber.

8. The flow rate measurement device according to claim 1,
wherein an output of the environment sensor is superimposed on an output of the flow rate measurement device such that the environment sensor shares the connector terminal.

9. A flow rate measurement device that is inserted into a through-hole which is disposed in piping, and measures a flow rate of a fluid to be measured that has a main passage in the piping, the flow rate measurement device comprising:
a connector that includes a connector terminal which transmits and receives a signal to and from an external device;
a flow rate detection element that is arranged in a bypass passage in which a part of the fluid to be measured passing through the main passage is taken;
a circuit board that includes a plurality of wire bonding pads, which are electrically connected to the connector terminal and the flow rate detection element respectively, on one surface;

a circuit board receiving portion that supports and receives the circuit board;

an environment sensor that is mounted on another surface of the circuit board opposite said one surface and measures at least one of temperature, humidity, and pressure of the fluid to be measured; and a measuring chamber that is disposed in the circuit board receiving portion, the environment sensor being arranged in the measuring chamber, wherein a recessed portion is disposed in an outer wall surface of the circuit board receiving portion forming the measuring chamber, said outer wall surface facing the fluid to be measured in said main passage and being parallel to a flow direction of said fluid to be measured passing through the main passage, and said recessed portion being a part of said outer wall surface that is recessed relative to other parts of said outer wall surface, and wherein a communication port allowing the main passage and the measuring chamber to communicate with each other is disposed in and surrounded by the recessed portion, and wherein a tapered portion is disposed in the recessed portion such that an opening portion of the recessed portion widens toward the main passage side, and wherein the tapered portion is disposed such that the opening portion widens in a radial shape.

\* \* \* \* \*